United States Patent [19]

Harris

[11] Patent Number: 5,229,703
[45] Date of Patent: Jul. 20, 1993

[54] BATTERY RECHARGE INTERCONNECTION SYSTEM WITH SAFETY CUT-OUT

[75] Inventor: Timothy S. Harris, Fort Wayne, Ind.

[73] Assignee: Kransco, San Francisco, Calif.

[21] Appl. No.: 833,320

[22] Filed: Feb. 10, 1992

[51] Int. Cl.⁵ ............................................. H02J 7/00
[52] U.S. Cl. ......................................... 320/2; 320/14
[58] Field of Search ............................... 320/2, 14

[56] References Cited

U.S. PATENT DOCUMENTS

| | | | |
|---|---|---|---|
| 3,581,480 | 6/1971 | O'Connor et al. | 56/11.9 |
| 3,898,547 | 8/1975 | Poole | 320/2 |
| 3,904,947 | 9/1975 | Crews | 320/2 |
| 3,916,280 | 10/1975 | Heindl | 320/48 |
| 4,146,825 | 3/1979 | Harhay | 320/23 |
| 4,157,123 | 6/1979 | Rodaway | 180/6.5 |
| 4,217,400 | 8/1980 | Leffingwell | 429/7 |
| 4,520,419 | 5/1985 | Locher et al. | 361/104 |
| 4,555,451 | 11/1985 | Harrod et al. | 429/1 |
| 4,563,626 | 1/1986 | Ohtake | 320/2 |
| 4,697,133 | 9/1987 | Pergandia | 320/2 |
| 5,085,043 | 2/1992 | Hess et al. | 56/10.5 |

FOREIGN PATENT DOCUMENTS 0927702  5/1955  Fed. Rep. of Germany .......... 320/2

*Primary Examiner*—Steven L. Stephan
*Assistant Examiner*—Thomas M. Dougherty
*Attorney, Agent, or Firm*—Kolisch, Hartwell, Dickinson, McCormack & Heuser

[57] ABSTRACT

A battery recharge interconnection system is provided for use on an electric toy vehicle or other load device powered by a rechargeable battery. The interconnection system includes a charger receptacle, operatively connected to a rechargeable battery, covered by a rotatable disc. An opening in the disc permits a plug from an external charger to be inserted through the opening and into the charger receptacle whenever the disc is rotated to a predetermined position in which the opening overlies the receptacle. The rotatable disc is also mechanically coupled to an actuator which engages and operates a cut-out switch or other device. During normal operation of the battery-operated device, the disc is rotated to a first position in which the charger receptacle is obstructed by the disc and the cut-out switch is disengaged. To recharge the device, the disc is rotated to a second position in which the opening in the disc overlies the receptacle, permitting a recharger plug to be inserted in the receptacle. When the disc is in the second position, the cut-out switch is engaged, preventing operation of the device. A current protection fuse in the charging circuit is also disclosed.

16 Claims, 2 Drawing Sheets

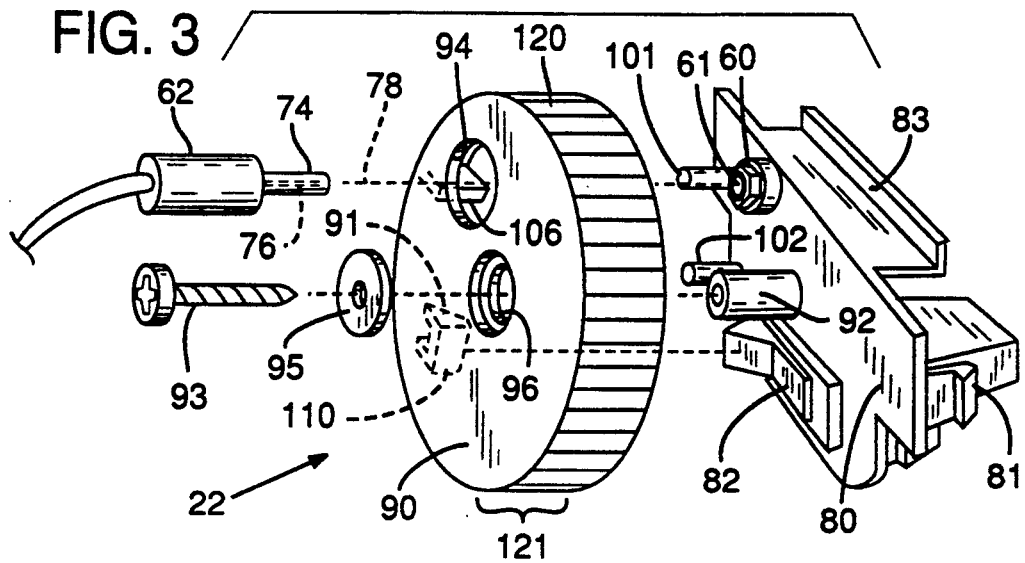

BATTERY RECHARGE INTERCONNECTION SYSTEM WITH SAFETY CUT-OUT

BACKGROUND AND SUMMARY OF THE INVENTION

The invention relates generally to a recharging system for devices such as a child's ride-on vehicle powered by a rechargeable battery, and more specifically to a recharger receptacle used in a battery recharge interconnection system which protects the battery and prevents operation of the battery-powered vehicle or other device while the battery is being recharged.

Battery powered vehicles such as children's ride-on cars or other toy vehicles usually receive power from one or more rechargeable batteries carried on the vehicle. In a typical electrical system used in some models of toy ridable vehicles, the vehicle battery is coupled to a connector plug which is mated with a cooperating connector on the wiring harness of the vehicle. Power to operate the vehicle is supplied through the wiring harness connector. To recharge the battery, the two halves of the connector are separated and the part connected to the battery is inserted into a cooperating connector on an external recharger, which supplies recharging current to the battery. When a recharging cycle is completed, the cooperating connector on the charger is separated from the battery connector plug and reconnected to the cooperating plug on the wiring harness. Since the wiring harness must be disconnected before the battery can be recharged, this prior art system has the advantage of eliminating the possibility of operating the vehicle during a recharging cycle. That is an important safety feature because it avoids the possibility of a child climbing on and operating the vehicle while it is recharging, which might entangle the child in external wires or damage the charger, the battery, or the vehicle.

The problem with the prior art charging system described above is that it requires the separation and reconnection of the two halves of the battery connector a minimum of three times for a single charging cycle. It would be far more convenient to provide a plug-type receptacle on the vehicle which is permanently connected to the battery terminals and into which a battery recharger could be plugged to recharge the battery. The risk with such a system is that a child may attempt to operate the vehicle while it is recharging.

Rechargeable batteries are recharged by feeding a charging current through the battery terminals. Excessive charging current can overheat and damage the battery and may present a leakage or rupture hazard. It can also damage the external recharger, its cord and the internal vehicle wiring. Excessive charging current can result from numerous causes, including shorts in the recharger cord, or shorts caused by foreign objects such as pins or paper clips which can lodge across the battery or charger terminals. On rechargeable toys such as children's ridable vehicles, it is particularly important that hazards resulting from excessive recharging current be eliminated. It would therefore be advantageous if some type of protective system is provided for limiting the recharger current supplied to the rechargeable battery on a toy ridable vehicle.

It would be advantageous to have a battery recharge interconnection system for use in toy riding vehicles, or in other battery-operated load devices powered by rechargeable batteries, which incorporates a receptacle assembly that is capable of disabling the vehicle or can otherwise protect against improper use of the battery-operated device during a recharging cycle.

It would be a further advantage if such a battery recharge interconnection system included a cut-out switch operatively connected to the electrical circuitry of the load device for interrupting the supply of power from the battery to the device whenever the battery is recharged.

It would be also be advantageous to have a battery recharge interconnection system which both disables the operation of the battery-operated device during recharging and which helps prevent dust, dirt and other foreign matter from entering the recharge receptacle.

Finally, it would be advantageous to have a battery recharge interconnection system which protects against excessive current to the battery by means of a current-limiting fuse that is simple and inexpensive to replace.

Accordingly, the present invention provides a battery recharge interconnection system for an electric vehicle, or for use in the electrical circuitry of another type of load device powered by a rechargeable battery. The interconnection system for an electric vehicle comprises a cut-out switch operatively connected to the vehicle wiring for rendering the vehicle inoperable when the cut-out switch is engaged and for permitting operation of the vehicle when the cut-out switch is disengaged. A charger receptacle is provided which is operatively connected to the rechargeable battery of the vehicle for mating with an external recharger to recharge the battery. Finally, an interlock is provided between the charger receptacle and the cut-out switch, in the form of an obstruction for the charger receptacle. The interlock operates to reposition the cut-out switch whenever the obstruction is moved, either to block or unblock the charger receptacle. Specifically, the obstruction is movable between a first position, in which the cut-out switch is disengaged and the obstruction prevents an external charger from mating with the receptacle, and a second position in which the cut-out switch is engaged and the obstruction is removed from blocking the charger receptacle. When the obstruction is in its second position, an external charger can be mated with the charger receptacle. Thus, whenever the battery is recharged the cut-out switch renders the vehicle inoperable.

In the embodiment of the invention used in the electrical circuitry of a load device powered by a rechargeable battery, the interconnection system comprises a cut-out switch operatively connected to the electrical circuitry for interrupting the power to the load device from the rechargeable battery. The system provides an obstruction for selectively blocking the charger receptacle. The obstruction is operatively connected to a cut-out switch for the device and is mounted for movement relative to the charger receptacle between first and second positions. In the first position, the cover prevents an external charger from mating with the receptacle and also disengages the cut-out switch. In the second position, the cover is removed from the charger receptacle, allowing an external charger to be mated with the receptacle, and it engages the cut-out switch. Whenever the cover is in its second position, the load device is inoperable and the battery can be recharged.

At the heart of the battery recharge interconnection system is a receptacle and actuator assembly for permitting electrical interconnections to be selectively made when the actuator portion of the assembly is moved to a predetermined position. The receptacle and actuator assembly comprises an electrical receptacle having an opening into which a plug is insertable to complete one or more electrical interconnections. When used with a battery recharge interconnection system, the charger receptacle is operatively connected to the electrical circuitry which supplies recharging current to a battery. A rotatable obstruction is pivotally mounted adjacent the receptacle for movement between a first position, in which the obstruction blocks the opening of the receptacle to prevent insertion of a plug into the receptacle, and a second position, in which the obstruction is rotated out of its blocking position. When the rotatable obstruction is in its second position, it permits insertion of a plug into the receptacle. An actuator is operatively coupled to the rotatable obstruction for operating a device separate from the electrical receptacle. The actuator is movable between first and second states in response to rotational movement of the obstruction between its respective first and second positions. A plug is insertable in the receptacle only when the actuator is moved to its second state. In the battery recharge interconnection system of the present invention, the actuator is operatively coupled to the cut-out switch and engages the cut-out switch when in its second state.

Finally, in the preferred embodiment of the invention, a current-limiting fuse is installed in the circuitry between the charger receptacle and the battery to prevent excessive charging current from damaging the battery, the external battery charger or the battery charger cord.

BRIEF DESCRIPTION OF THE DRAWINGS

FIG. 3 is a partial perspective view, partially exploded, showing the receptacle assembly of the present invention as used in the battery recharge interconnection system of FIGS. 1 and 2.

FIG. 4 is a top plan view, partially in phantom, illustrating the various parts of the receptacle assembly shown in FIG. 3.

FIGS. 5A and 5B are side plan views, partially in cross-section, taken along lines 5A—5A of FIG. 4, on an enlarged scale, illustrating how the actuator arm of the receptacle assembly of FIGS. and 4 repositions the cut-out switch. FIG. 5A shows the cut-out switch in its disengaged position and FIG. 5B shows the cut-out switch in its engaged position.

DETAILED DESCRIPTION OF THE PREFERRED EMBODIMENT

Figure 1:
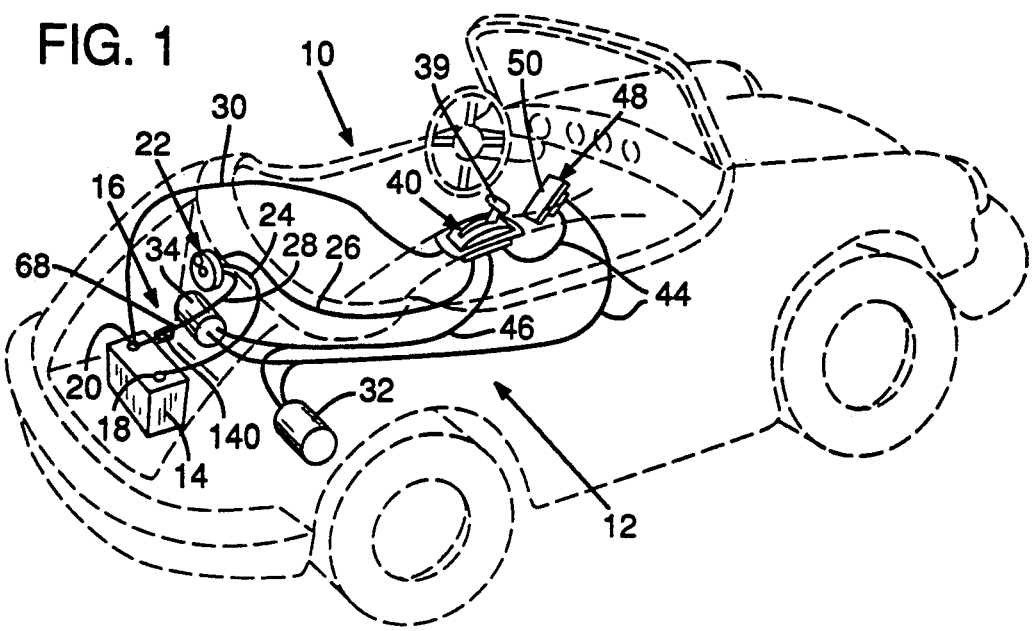
FIG. 1 is a partial, schematic, perspective view of a child's ridable vehicle shown in phantom, with the major parts of the wiring harness, incorporating the battery recharge interconnection system of the present invention, shown with solid lines.

Referring to FIG. 1, a child's ridable toy vehicle 10 is shown in phantom. Certain parts of vehicle 10, such as the seats, trunk lid and battery enclosure housing, have been deleted from the phantom image to more clearly show the key parts of the vehicle wiring harness 12. Wiring harness 12 includes the principal electrical devices in the drive train or drive system used to power and drive vehicle 10. The vehicle shown in FIG. 1 is a toy version of a rear-engine car, such as a Porsche. Like the real car, vehicle 10 has its power unit, in the form of rechargeable battery 14, located in the rear compartment 16 of the vehicle. Typically, in a completely assembled version of vehicle 10, battery 14 will be covered by a housing which resembles or simulates an automotive engine.

Battery 14 is preferably an 18-volt, solid gel rechargeable battery. The negative and positive terminals 18, 20, respectively of battery 14 are operatively connected by electrical wires to the various electrical components of wiring harness 12. Battery terminals 18, 20 are also connected to a recharge interconnector 22 on the vehicle for recharging the battery. Interconnector 22 is at the heart of the battery recharge interconnection system of the present invention and is described in detail below.

The wires in wiring harness 12 include a negative battery line 24, operatively connecting battery terminal 18 with recharge interconnector 22. A negative wiring harness lead 26 extends from interconnector 22 to the other parts of the wiring harness. A positive wiring harness lead 30 operatively connects positive battery terminal 20 with the other parts of wiring harness 12. Electrical system 12 also include drive motors 32, 34, a forward-reverse switch 40, and an on-off switch 48. The forward-reverse switch 40 is preferably mounted near the driving position of the vehicle, in the form of a simulated shift lever 39 which is moved in the direction of arrows 41, 42 (FIG. 2) to select forward and reverse operation. On-off switch 48 is preferably mounted on the floor and is covered by a simulated gas pedal 50 which is depressed by the driver's foot to energize drive motors 32, 34. Numerous other devices (not shown) may also be operatively connected to the wiring harness of the vehicle, including a horn, headlights, a speed selector or controller and other accessories. The vehicle illustrated in the figures includes only the basic elements necessary to fully describe the battery recharge interconnection system of the present invention.

Forward-reverse switch 40 is a conventional double-pole double-throw switch wired to offer selective reverse polarity. It is illustrated schematically and pictorially in FIG. 2. Battery voltage, supplied at a fixed polarity, is applied to common parallel terminals 43, 44 on switch 40 via negative and positive wiring harness leads 26, 30, respectively. When the double-pole switch engages the forward terminals connected to switch output lines 45, 46, the polarity of the output lines will be the same as on wiring harness leads 26, 30. When switch 40 is placed in the reverse position, engaging terminals 47, 48, switch 40 reverses the battery polarity on output lines 45, 46.

Figure 2:
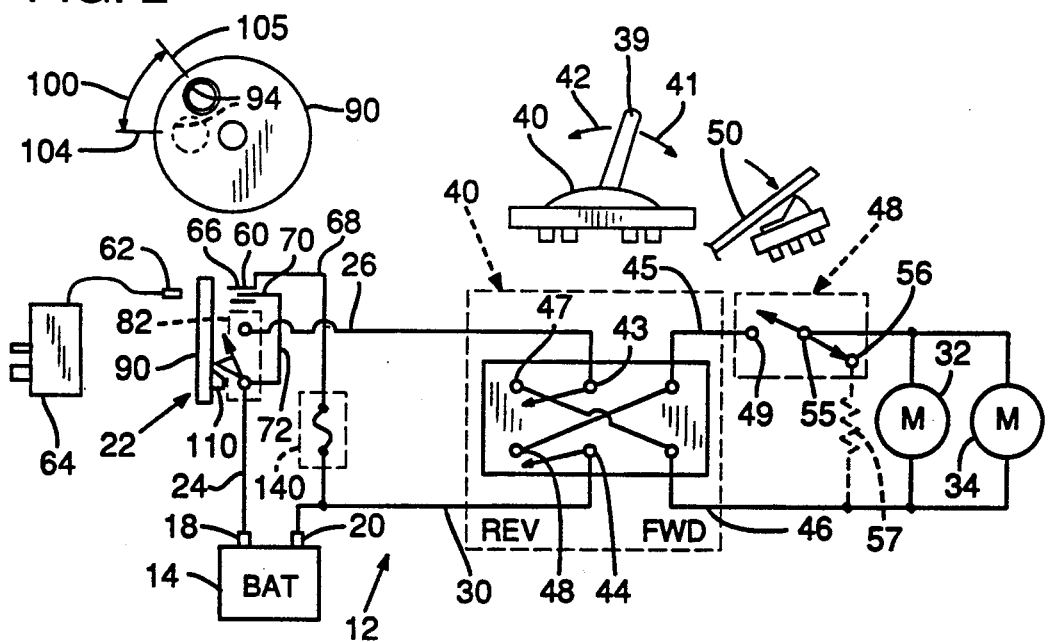
FIG. 2 is a partially schematic circuit diagram showing the major elements of the vehicle wiring harness of FIG. 1 and also showing the battery recharge interconnection system of the present invention.

The principal load devices on vehicle 10 are motors 32, 34, which are conventional direct-current motors wired in parallel and energized by battery 10 through forward-reverse switch 40 and switch 48. Switch 48 is an on-off switch which is "on" when input terminal 49 is electrically connected to middle terminal 55 on the switch, which occurs whenever pedal 50 is depressed. Switch 48 is preferably a double-pole switch which can also be used to make a connection with a brake resistor 57 (shown in phantom in FIG. 2). Whenever gas pedal 50 is released by the driver, an internal spring in switch 48 opens the connection between terminals 49 and 55 and closes the connection between terminals 55 and 56. If a brake resistor 57 is provided, the voltage across motors 32, 34 is shunted through the brake resistor which dissipates energy generated by the motors and rapidly slows the vehicle to a stop. The wiring configuration shown in FIG. 2 provides for only a single speed of operation in which motors 32, 34 are selectively supplied with full battery voltage, or supplied with zero voltage. An alternative motor wiring configuration which allows for two-speed operation of vehicle 10 is shown in FIG. 2 of co-pending patent application Ser. No. 07/833,980, filed Feb. 10, 1992, entitled ELECTRIC DRIVE SYSTEM FOR A CHILD'S RIDABLE VEHICLE, invented by Timothy S. Harris, the disclosure of which is incorporated herein by reference. The battery recharge interconnection system of the present invention can be used with the single-speed or two-speed motor wiring configuration, or with another motor wiring configuration.

At the heart of the battery recharge interconnection system of the present invention is a receptacle and actuator assembly 22, shown in detail in FIGS. 2-4. Assembly 22 includes a female battery charger plug receptacle 60 having a orifice 61 into which a cooperating male battery charger plug 62 is inserted to complete one or more electrical interconnections. Charger plug 62 is connected to an external charger 64 by charger cord 63. FIG. 2 depicts receptacle 60 schematically, in cross section. Receptacle 60 has an outer sleeve portion 66 interconnected with the positive terminal 20 of battery 14 by a first recharger current supply line 68. An axial pin disposed centrally within sleeve 66 forms the other terminal 70 of charger receptacle 60. Central pin 70 is connected to the opposite terminal of battery 14 via a second recharger current supply line 72, which communicates with negative battery connector line 24.

A male battery charger plug 62, designed to mate with receptacle 60, is shown in FIG. 3. Plug 62 is insertable into receptacle 60 along an insertion axis 78. The insertion axis of receptacle 60 extends through the center of receptacle orifice 61. Plug 62 includes an outer sleeve 74 (see FIG. 3) for engaging outer sleeve 66 of receptacle 60, and a inner sleeve 76 for encircling and mating with pin 70. The external charger unit 64 (FIG. 2) is designed to be energized by a household current and includes a transformer to supply the necessary current to recharge battery 14 by conventional recharging processes well known to those skilled in the art.

Charger receptacle 60 is mounted on a mounting plate 80 designed to support the various parts of the receptacle and actuator assembly of the present invention. Mounting plate 80, also referred to as a mounting frame or mounting body, is designed to be mounted on the wall of the trunk compartment 16 of vehicle 10. Mounting plate 80 is made of molded plastic and includes one or more snap hooks 81 and engaging flanges 83 at suitable locations along its periphery to facilitate mounting.

Another part of assembly 22 is a cut-out switch 82 mounted on mounting plate 80. Cut-out switch 82 is a conventional see-saw switch which is pivotable between two positions to selectively open or close a circuit. Cut-out switch 82 is illustrated schematically in FIG. 2, below the charger receptacle, and in perspective in FIG. 3. It is electrically interconnected between the negative terminal 18 of battery 14 (via negative battery connector line 24) and negative wiring harness lead 26. The purpose of cut-out switch 82 is to disable the vehicle, rendering it inoperable whenever the battery is being recharged. In FIG. 2, cut-out switch 82 is depicted in its engaged position, in which the switch is open, meaning the "cut-out" is engaged. In its disengaged position, switch 82 is closed, meaning there is no "cut-out" in the circuit. Whenever switch 82 is engaged (i.e., open), vehicle 10 is inoperable.

A pivotally-mounted circular disc 90 is mounted on plate 80 and serves as an obstruction for selectively blocking charger receptacle 60. Disc 90 is mounted for rotation about a pivot axis 91, the pivot axis being generally parallel with the insertion axis 78 of receptacle 60. The disc is preferably made of molded plastic and is rotatable about a central pivot axis 9 (see FIG. 3). The disc has a sufficient radius to extend over both charger receptacle 60 and cut-out switch 82. An opening or aperture 94 extends through disc 90. Opening 94 is positioned on disc 90 so it can be moved into registration with the insertion axis 78 of charger receptacle 60. In other words, the center of aperture 94 and the insertion axis 78 of receptacle 60 are spaced the same distance from the rotational axis 91 of the disc. Consequently, disc 90 can be rotated about axis 91 until opening 94, which moves with disc 90, is positioned directly over charger receptacle 60. Opening 94 is large enough for the male charger plug 62 from external charger 64 to be extended or inserted through the opening into receptacle 60.

A raised central support post 92 extends outwardly from the face of mounting plate 80. A retaining screw 93, extends through a central opening 96 in the center of the disc. Screw 93 and a washer 95 hold the disc on post 92 in a manner which allows for rotation of the disc about pivot axis 91. When disc 90 is mounted on post 92, it is movable across or over receptacle 60 in a direction transverse to and intersecting with insertion axis 78 of the receptacle. Several elements limit or control the rotational movement of disc 90 about its pivotal axis. A pair of movement-limiting posts 101, 102 extend outwardly from the face of mounting plate 80 toward disc 90. Posts 101, 102 are somewhat shorter than pivot support post 92 and are designed to extend toward the underside 103 of disc 90. A tang 106 formed on or attached to the underside 103 of disc 90 is positioned on the disc to strike posts 101, 102 to stop its rotation at selected orientations.

With disc 90 mounted on post 92 and with tang 106 positioned between posts 101 and 102, the disc can be rotated over a limited angular range indicated at 100 in FIG. 2. The limit of counterclockwise rotational movement for disc 90, in direction 107 (see FIGS. 2 and 4), occurs when tang 106 strikes post 102. That position is called the first position 104 of the disc. The limit of clockwise rotational movement for disc 90, in direction 108, occurs when tang 106 strikes post 101. That position is called the second position 105 of the disc. In its first position, disc opening 94 is offset from charger receptacle 60. Consequently, disc surface 90 acts as an obstruction for the charger receptacle, preventing an external charger from mating with the receptacle. When disc 90 is in its second position, opening 94 is in registration or alignment with charger receptacle 60 and the obstruction is removed, allowing an external charger to mate with the charger receptacle through aperture 94.

Disc 90 also serves as an actuator which repositions cut-out switch 82, selectively engaging or disengaging the switch as the disc is rotated. That function is accomplished by means of an actuator arm 110 attached to the underside 103 of disc 90. Referring to FIGS. 3, 4, 5A and 5B, when the disc is assembled on mounting plate 82, actuator arm 110 is located immediately adjacent or overlying cut-out switch 82. The actuator arm 110 is a short, wedge-shaped extension of molded plastic or another material formed integrally with, or attached to, the underside of the disc. Arm 110 is long enough to touch and engage see-saw switch 82 and to move it from one position to the other as disc 90 rotates between its first and second positions, 104, 105, respectively.

FIGS. 5A and 5B illustrate, in enlarged cross-sectional views, the repositioning of cut-out switch 82 by actuator arm 110. In FIG. 5A, disc 90 is in its first position 104 (see FIG. 2), having been rotated in a counterclockwise direction 107 to the limit of its rotational travel. When disc 90 is in its first position, actuator arm 110 is in its first operational state, positioned over the right half of cut-out switch 82 (as viewed in FIGS. 5A and 5B). When arm 110 is in its first state, it depresses the right half of switch 82, disengaging the cut-out. In that position, cut-out switch 82 is electrically closed and lines 24 and 26 are connected to one another to supply battery power to motors 32, 34. Thought of in another way, the electrical connection posts 114, 115 at the base of cut-out switch 82, used for making electrical connections to the switch, are electrically coupled when switch 82 is in the position shown in FIG. 5A.

In FIG. 5B, disc 90 is in its second position 105, having been rotated in a clockwise direction 108 to the limit of its rotational travel. When disc 90 is in its second position 105, actuator arm 110 is in its second state, positioned over the left half of cut-out switch 82 (as viewed in FIG. 5B), which is the engaged position of the cut-out switch. In that position, terminals 114 and 115 are disconnected and cut-out switch 82 is open. When cut-out switch 82 opens, the power supply from battery 14 to the wiring harness 12 of vehicle 10 is broken. Only when actuator 110 is in its predetermined second state, shown in FIG. 5B, can charger plug 62 be inserted into receptacle 60 to make the necessary electrical interconnections for recharging battery 14.

Cut-out switch 82 is preferably biased toward the closed (or "disengaged") position shown in FIG. 5A. In other words, switch 82 has an internal spring which urges the left half of the rocker switch (as viewed in FIG. 5A) in the direction of arrow 111. When disc 90 is moved to first position 104, the switch automatically returns to the position shown in FIG. 5A. When disc 90 is rotated in clockwise direction 108, the leading edge 113 of actuating arm 110, which is angled and forms a ramp, engages the sloping face 116 on the left side of see-saw switch 82 and forces the left side of the switch downwardly. No ramp is required on the right side of actuating arm 110 because of the internal bias of switch 82.

To facilitate the rotation of disc 90, the outer periphery of the disc preferably includes a widened edge 120 which is wider than the thickness 122 of the disc itself (see FIGS. 3, 4, 5A and 5B). Suitable grip contours such as knurls are provided on the outside periphery of edge 120. Disc 90 has a diameter of approximately 2 ½-inches, an overall thickness 122, in the region radially inward from peripheral edge 120, of less than ⅛-inch. The outer peripheral edge of disc 90 has a width 121 of approximately ½-inch (see FIG. 3). Disc 90 could alternatively be referred to as a knob which is grasped and turned to control the obstruction of charger receptacle 60 and to actuate cut-out switch 82.

Operation of the battery recharge interconnection system is simple and safe. Whenever the user desires to recharge battery 14, disc 90 is rotated from its operating or first position 104, in a clockwise direction 108, to second position 105. When in its second position, the opening 94 in disc 90 is aligned with charger receptacle 60, permitting a charger plug 62 from an external charger to be inserted through disc opening 94 into receptacle 60. Also, when disc 90 is in its second position, cut-out switch 82 is engaged and the battery is disconnected from the vehicle wiring harness. When a charging cycle has been completed, which generally requires a period of hours, charger plug 62 is removed from receptacle 60 and disc 90 is rotated in a counterclockwise direction 107, from second position 105 to first position 104. Once the disc is in its first position, opening 94 is offset from charger receptacle 60 and the disc blocks and obstructs receptacle orifice 61, preventing a charger plug from being inserted in the receptacle. Also, the actuator arm 110 disengages cut-out switch 82, permitting operation of the vehicle.

The battery recharge interconnection system of the present invention includes an additional protective feature in the form of a fuse 140 in the charging circuit of battery 14 (see FIGS. 1 and 2). Fuse 140 is located in the positive side recharger current supply line 68, which connects charger receptacle 60 and interconnector 22 with battery terminal 20. Fuse 140 prevents excessive current flow in the circuit extending from the external charger to the battery. Preferably fuse 140 is a 5-amp fuse, which limits the charging current supplied to battery 14 via charger 64, charger cord 63, and plug 62 to 5-amps or less. Fuse 140 protects against several hazards which might arise in a child's toy electric vehicle. For example, if the recharger cord is accidentally shorted due to a kinking, pinching, or fraying, fuse 140 would blow before the battery, charger, or cord would be damaged. Alternatively, should a child inadvertently insert a bobby pin, paper clip or other conductive object into the charger receptacle, a short circuit would develop across the battery which would immediately blow fuse 140. Thus, the fuse protects the battery, the external charger and persons using the vehicle from the danger and damage caused by excessive current in the battery charging circuit. Prior art recharge protection systems often used diodes or other types of current-limiting devices. Such prior art current limiting devices are effective, but are not as inexpensive and simple to replace as a conventional fuse.

The battery recharge interconnection system of the present invention simplifies the recharging process by proving an easily-accessible charger receptacle permanently connected to the battery. There is no need to disconnect and reconnect connector plugs to recharge the battery. In order to use the charger receptacle, the user only needs to rotate the disc to the position which permits insertion of the charger plug into the receptacle 60. Positioning the disc for recharging automatically engages the cut-out switch, thereby eliminating the possibility of operating the vehicle during a recharging cycle. Disc 90 also serves as a cover for the charger receptacle opening, preventing dust and debris from entering the receptacle.

The system of the present invention, while depicted for use in a child's ridable vehicle, can also be employed in electrical circuitry for any other type of load device powered by a rechargeable battery. Regardless of the type of load device, the battery recharge interconnection system of the present invention provides an automatic cut-out switch which interrupts the power to the load device whenever the user recharges the battery.

The invention provides a unique receptacle and actuator assembly for recharging a battery, or for performing other useful electrical interconnections using a plug and receptacle. A rotatable obstruction selectively blocks or unblocks the receptacle, depending on the state of an operatively-coupled actuator. Unless disc 90 is removed from mounting plate 80, the interlock between cut-out switch 82 and access to charger receptacle 60 is assured. Screw 93 could be replaced by a permanent rivet or other suitable attachment to prevent disengagement of disc 90 from mounting plate 82, to ensure that the interlock is not tampered with.

The present invention is particularly adapted for use on rechargeable electric toy vehicles of the type ridden by children. In one such vehicle incorporating the present invention, an 18-volt battery supplies two drive motors which move the vehicle at a maximum speed of 8-miles-per-hour or less. Alternative types of vehicles with different power supplies may also employ the battery recharge interconnection system of the present invention.

What is claimed is:

1. A battery recharge interconnection system for an electric vehicle powered by a rechargeable battery, comprising:
   a cut-out switch operatively connected to the vehicle wiring for rendering the vehicle inoperable when the cut-out switch is engaged and for permitting operation of the vehicle when the cut-out switch is disengaged,
   a charger receptacle operatively connected to the rechargeable battery of the vehicle for mating with an external recharger to recharge the battery, and
   a movable receptacle cover on the vehicle for selectively obstructing the charger receptacle, the cover being operatively connected to the cut-out switch and being movable between a first position in which the cover blocks the charger receptacle to prevent an external charger from mating with the charger receptacle and in which the cut-out switch is disengaged to permit operation of the vehicle, and a second position in which the cover unblocks the charger receptacle to permit an external charger to be mated with the charger receptacle and in which the cut-out switch is engaged to prevent operation of the vehicle, whereby the vehicle is inoperable during recharging of the battery.

2. A battery recharge interconnection system for an electric vehicle powered by a rechargeable battery, comprising:
   a cut-out switch operatively connected to the vehicle wiring for rendering the vehicle inoperable when the cut-out switch is engaged and for permitting operation of the vehicle when the cut-out switch is disengaged,
   a female charger receptacle operatively connected to the rechargeable battery of the vehicle for mating with a charger plug from an external charger which is insertable into the charger receptacle along an insertion axis to recharge the battery, and
   a cover for the charger receptacle operatively connected to the cut-out switch, the cover being mounted for movement between first and second positions in a direction transverse to the insertion axis of the charger receptacle, wherein when the cover is in the first position the cut-out switch is disengaged and the cover prevents an external charger from mating with the charger receptacle, and when the cover is in the second position the cut-out switch is engaged and the cover is moved to a nonblocking position relative to the charger receptacle permitting an external charger to be mated with the charger receptacle, whereby the vehicle is inoperable during recharging of the battery.

3. A battery recharge interconnection system as in claim 2 in which the cover includes an opening through which a charger plug is extendable to mate with the charger receptacle, the opening being movable with the cover between a first position in which the opening is out of alignment with the charger receptacle and the cover obstructs the charger receptacle, and a second position in which the opening overlies the charger receptacle to permit a charger plug to be inserted into the charger receptacle through the opening in the cover.

4. A battery recharge interconnection system as in claim 3 in which the cover is supported over the charger receptacle on a pivot, the cover being rotatable between the first and second positions.

5. A battery recharge interconnection system as in claim 4 in which the cover includes a generally circular disc supported over the charger receptacle on the pivot for rotation between the first and second positions.

6. A battery recharge interconnection system as in claim 1 including a current-limiting fuse in the connection between the charger receptacle and the rechargeable battery for limiting the charging current supplied to the battery.

7. A battery recharge interconnection system for use in the electrical circuitry of a load device powered by a rechargeable battery, the interconnection system comprising:
   a cut-out switch operatively connected to the electrical circuitry for interrupting the power to the load device from the rechargeable battery when the cut-out switch is engaged and for permitting power from the battery to energize the load device when the cut-out switch is disengaged,
   a charger receptacle for mating with an external recharger, the charger receptacle being operatively connected to the electrical circuitry to supply recharging current to the battery, and
   a movable receptacle cover adjacent the charger receptacle for selectively blocking the charger receptacle, the cover being operatively connected to the cut-out switch and mounted for movement relative to the charger receptacle between a first position, in which the cover blocks the charger receptacle and prevents an external charger from mating with the charger receptacle to recharge the battery and also disengages the cut-out switch, and a second position in which the cover unblocks the charger receptacle permitting an external charger to be mated with the charger receptacle and the cut-out switch is engaged, whereby the load device is inoperable during recharging of the battery.

8. A battery recharge interconnection system for use in the electrical circuitry of a load device powered by a rechargeable battery, the interconnection system comprising:
   a cut-out switch operatively connected to the electrical circuitry for interrupting the power to the load device from the rechargeable battery when the cut-out switch is engaged and for permitting power from the battery to energize the load device when the cut-out switch is disengaged, a female charger receptacle having an opening into which a charger plug from an external charger is inserted along an insertion axis when the receptacle is mated with an external recharger to recharge the battery, the charger receptacle being operatively connected to the electrical circuitry to supply recharging current to the battery, and an obstruction for selectively blocking the charger receptacle operatively connected to the cut-out switch and mounted for movement relative to the charger receptacle in a direction transverse to the insertion axis of the charger receptacle between a first position, in which the obstruction prevents an external charger from mating with the charger receptacle to recharge the battery and also disengages the cut-out switch, and a second position in which the obstruction is removed from the charger receptacle permitting an external charger to be mated with the charger receptacle and the cut-out switch is engaged, whereby the load device is inoperable during recharging of the battery.

9. A battery recharge interconnection system as in claim 8 in which the obstruction is a cover for the charger receptacle mounted for movement between first and second positions corresponding to the first and second positions of the obstruction, the cover including an aperture therethrough which is out of alignment with the insertion axis of the charger receptacle when the cover is in its first position, whereby the cover obstructs the charger receptacle, and is aligned with the insertion axis of the charger receptacle when the cover is in its second position, permitting a charger plug to be inserted into the charger receptacle through the aperture.

10. A battery recharge interconnection system as in claim 9 in which the cover is supported over the charger receptacle on a pivot, the cover being rotatable between the first and second positions.

11. A battery recharge interconnection system as in claim 10 in which the cover which forms the obstruction includes a generally circular disc supported over the charger receptacle on the pivot for rotation about the pivot between the first and second positions.

12. A battery recharge interconnection system as in claim 7 including a fuse in the operative connection between the charger receptacle and the battery for limiting the charging currents applied to the battery.

13. A receptacle and actuator assembly for permitting electrical interconnections to be selectively made when the actuator portion of the assembly is moved to a predetermined position, comprising:

an electrical receptacle having an opening into which a plug is insertable to complete one or more electrical interconnections, a cover for the receptacle rotatably mounted adjacent the receptacle, the cover being rotatable between a first position in which the cover blocks the opening of the receptacle to prevent insertion a plug into the receptacle and a second position in which the cover is rotated out of its blocking position, thereby permitting insertion of a plug into the receptacle, and an actuator operatively coupled to the cover for operating a device separate from the electrical receptacle, the actuator being movable between first and second states in response to rotational movement of the cover between its respective first and second positions, whereby a plug is insertable in the receptacle only when the actuator is moved to its second state.

14. A receptacle and actuator assembly for permitting electrical interconnections to be selectively made when the actuator portion of the assembly is moved to a predetermined position, comprising:

an electrical receptacle having an opening into which a plug is insertable to complete one or more electrical interconnections, the receptacle opening having an insertion axis along which the plug is insertable, a rotatable obstruction mounted adjacent the receptacle including a rotatable disc mounted for rotation about a pivot axis which is generally parallel with the insertion axis of the receptacle, the disc including an aperture therethrough through which a plug is extendable for insertion into the receptacle, the aperture being movable into and out of alignment with the receptacle, and the disc being rotatable about its pivot axis between a first position in which the aperture is out of alignment with the receptacle, whereby when the disc is in its first position the disc covers and blocks the receptacle opening and prevents insertion of a plug into the receptacle, and a second position in which the disc is rotated such that the aperture is in alignment with the receptacle, thereby permitting insertion of a plug into the receptacle through the aperture, and an actuator operatively coupled to the disc for operating a device separate from the electrical receptacle, the actuator being movable between first and second states in response to rotational movement of the disc between its respective first and second positions, whereby a plug is insertable in the receptacle only when the actuator is moved to its second state.

15. A receptacle and actuator assembly as in claim 14 in which the actuator is operatively coupled to the disc and operates a switch mounted adjacent the disc, the switch being repositioned as the actuator moves between its first and second states in response to rotation of the disc between its respective first and second positions.

16. A receptacle and actuator as in claim 13 in which the actuator operates a switch, the receptacle and actuator including a mounting plate for mounting the receptacle and switch, in which the rotatable obstruction is a rotatable disc pivotally mounted on the plate, the disc extends over the receptacle and the switch and includes an aperture therethrough through which a plug is extendable for insertion into the receptacle, the aperture being movable into alignment with the receptacle when the disc is rotated into its second position, and the actuator being an arm attached to the disc for repositioning the switch when the disc is rotated between its first and second positions.

* * * * *